United States Patent
Muthu et al.

(10) Patent No.: US 8,076,026 B2
(45) Date of Patent: Dec. 13, 2011

(54) RECHARGEABLE BATTERY USING AN AQUEOUS BINDER

(75) Inventors: Milburn Ebenezer Jacob Muthu, Breinigsville, PA (US); Jacob Benjamin Behler, Allentown, PA (US)

(73) Assignee: International Battery, Inc., Allentown, PA (US)

( * ) Notice: Subject to any disclaimer, the term of this patent is extended or adjusted under 35 U.S.C. 154(b) by 0 days.

(21) Appl. No.: 12/701,001

(22) Filed: Feb. 5, 2010

(65) Prior Publication Data

US 2011/0136009 A1 Jun. 9, 2011

(51) Int. Cl.
*H01M 4/62* (2006.01)

(52) U.S. Cl. ...... 429/217; 429/212; 429/232; 429/231.1

(58) Field of Classification Search .......... 429/217, 429/212, 231.1, 223, 231.3, 224, 232, 231.95, 429/324, 218.1; 428/474.4
See application file for complete search history.

(56) References Cited

U.S. PATENT DOCUMENTS

| | | |
|---|---|---|
| 5,150,283 A | 9/1992 | Yoshida et al. |
| 5,175,222 A | 12/1992 | Betso et al. |
| 5,514,488 A | 5/1996 | Hake et al. |
| 5,707,756 A | 1/1998 | Inoue et al. |
| 5,795,558 A | 8/1998 | Aoki et al. |
| 5,866,279 A | 2/1999 | Wada et al. |
| 5,897,955 A * | 4/1999 | Drumheller .................. 428/422 |
| 6,007,947 A | 12/1999 | Mayer |
| 6,031,712 A | 2/2000 | Kurihara et al. |
| 6,159,636 A | 12/2000 | Wang et al. |
| 6,183,908 B1 | 2/2001 | Miyasaka et al. |
| 6,235,427 B1 | 5/2001 | Idota et al. |
| 6,282,081 B1 | 8/2001 | Takabayashi et al. |
| 6,372,387 B1 | 4/2002 | Kawakami et al. |
| 6,399,246 B1 | 6/2002 | Vandayburg et al. |
| 6,497,979 B1 | 12/2002 | Iijima et al. |
| 6,602,742 B2 | 8/2003 | Maletin et al. |
| 6,616,903 B2 | 9/2003 | Poles et al. |
| 6,627,252 B1 | 9/2003 | Nanjundiah et al. |
| 6,697,249 B2 | 2/2004 | Maletin et al. |
| 6,770,397 B1 | 8/2004 | Maeda et al. |
| 6,811,911 B1 * | 11/2004 | Peled et al. .................. 429/499 |
| 6,852,449 B2 | 2/2005 | Nagata et al. |
| 6,881,517 B1 | 4/2005 | Kanzaki et al. |
| 6,946,007 B2 | 9/2005 | Bendale et al. |
| 6,955,694 B2 | 10/2005 | Bendale et al. |
| 7,052,629 B2 | 5/2006 | Maeda et al. |

(Continued)

FOREIGN PATENT DOCUMENTS

EP 0573266 12/1993

(Continued)

OTHER PUBLICATIONS

Title: "Effect of pH on the Synthesis of LiCoO2 with Malonic Acid and Its Charge/Discharge Behavior for a Lithium Secondary Battery" Source: Bulletin of the Korean Chemical Society 2000, vol. 21, No. 11 pp. 1125-1132.

(Continued)

*Primary Examiner* — Raymond Alejandro
(74) *Attorney, Agent, or Firm* — Design IP

(57) ABSTRACT

A battery having an electrode mix comprising water, a conductive additive and poly (acrylonitrile-co-acrylamide) co-polymer as a binder. The use of poly (acrylonitrile-co-acrylamide) co-polymer eliminates the need for a separate thickener.

13 Claims, 4 Drawing Sheets

U.S. PATENT DOCUMENTS

| | | |
|---|---|---|
| 7,052,803 B2 | 5/2006 | Kato et al. |
| 7,083,829 B2 | 8/2006 | Hoke et al. |
| 7,227,737 B2 | 6/2007 | Mitchell et al. |
| 7,267,907 B2 | 9/2007 | Kim |
| 7,316,864 B2 | 1/2008 | Nakayama et al. |
| 7,393,476 B2 | 7/2008 | Shiozaki et al. |
| 7,419,745 B2 | 9/2008 | Chaturvedi et al. |
| 7,422,826 B2 | 9/2008 | Xing et al. |
| 7,425,386 B2 | 9/2008 | Takezawa et al. |
| 7,481,991 B2 | 1/2009 | Kawasato et al. |
| 7,508,651 B2 | 3/2009 | Mitchell et al. |
| 7,531,272 B2 | 5/2009 | Park et al. |
| 7,547,491 B2 | 6/2009 | Ham et al. |
| 7,558,050 B2 | 7/2009 | Roh et al. |
| 7,749,658 B2 | 7/2010 | Isono et al. |
| 2002/0110732 A1 | 8/2002 | Coustier et al. |
| 2003/0091883 A1 | 5/2003 | Peled et al. |
| 2003/0118904 A1 | 6/2003 | Hosokawa et al. |
| 2003/0138696 A1 | 7/2003 | Peres et al. |
| 2003/0172509 A1 | 9/2003 | Maletin et al. |
| 2004/0020763 A1 | 2/2004 | Kanzaki et al. |
| 2004/0023115 A1 | 2/2004 | Kato et al. |
| 2004/0121232 A1 | 6/2004 | Kato et al. |
| 2004/0234850 A1 | 11/2004 | Watarai et al. |
| 2005/0069769 A1 | 3/2005 | Nakayama et al. |
| 2005/0074669 A1 | 4/2005 | Park et al. |
| 2005/0142446 A1 | 6/2005 | Yamamoto et al. |
| 2005/0238958 A1* | 10/2005 | Kim .............. 429/217 |
| 2006/0058462 A1 | 3/2006 | Kim et al. |
| 2006/0166093 A1 | 7/2006 | Zaghib et al. |
| 2006/0194116 A1 | 8/2006 | Suzuki et al. |
| 2006/0228627 A1 | 10/2006 | Nakayama et al. |
| 2006/0275661 A1 | 12/2006 | Kim et al. |
| 2007/0055023 A1 | 3/2007 | Han et al. |
| 2007/0264568 A1 | 11/2007 | Ryu et al. |
| 2007/0264573 A1 | 11/2007 | Yamada et al. |
| 2007/0292765 A1 | 12/2007 | Inoue et al. |
| 2008/0089006 A1 | 4/2008 | Zhong et al. |
| 2008/0090138 A1 | 4/2008 | Vu et al. |
| 2008/0118834 A1 | 5/2008 | Yew et al. |
| 2008/0118840 A1 | 5/2008 | Yew et al. |
| 2008/0160415 A1 | 7/2008 | Wakita et al. |
| 2008/0212260 A1 | 9/2008 | Roh et al. |
| 2008/0254362 A1 | 10/2008 | Raffaelle et al. |
| 2008/0299461 A1 | 12/2008 | Kim |
| 2009/0080141 A1 | 3/2009 | Eilertsen |
| 2009/0148772 A1 | 6/2009 | Kawasato et al. |
| 2009/0155694 A1 | 6/2009 | Park |
| 2009/0214952 A1 | 8/2009 | Wakita et al. |
| 2009/0220678 A1 | 9/2009 | Kono et al. |
| 2009/0258296 A1 | 10/2009 | Kawasato et al. |
| 2009/0268377 A1 | 10/2009 | Choi et al. |
| 2009/0317718 A1 | 12/2009 | Imachi et al. |
| 2010/0009258 A1 | 1/2010 | Hasegawa et al. |
| 2010/0047690 A1 | 2/2010 | Tsuchiya et al. |
| 2010/0075229 A1 | 3/2010 | Atsuki et al. |
| 2010/0112441 A1 | 5/2010 | Fukumine et al. |
| 2010/0117031 A1 | 5/2010 | Akagi et al. |
| 2010/0136430 A1 | 6/2010 | Lee |
| 2010/0140554 A1 | 6/2010 | Oki et al. |
| 2010/0143799 A1 | 6/2010 | Park |
| 2011/0045168 A1* | 2/2011 | Seo et al. ............ 427/58 |

FOREIGN PATENT DOCUMENTS

| | | |
|---|---|---|
| EP | 932212 A1 | 7/1999 |
| EP | 1172878 | 1/2002 |
| GB | 2083087 A | 3/1982 |
| JP | 62270337 A | 11/1987 |
| JP | 2058055 | 6/1990 |
| JP | 8069791 | 3/1996 |
| JP | 10208729 | 8/1998 |
| JP | 11149929 | 6/1999 |
| JP | 2002226505 | 8/2002 |
| JP | 2004185826 | 7/2004 |
| SU | 927801 A1 | 5/1982 |
| WO | 9413781 A1 | 6/1994 |
| WO | 2004079841 A1 | 9/2004 |
| WO | WO2007142579 | 12/2007 |

OTHER PUBLICATIONS

W. Porcher et al., Design of Aqueous Processed Thick LiFePO4 Composite Electrodes for High-Energy Lithium Battery, Journal of the Electrochemical Society, 156(3), 2009, A133-A133.

Yoon, Dang-Hyok et al., Processing of Barium Titanate Tapes with Different Binders for MLCC Applications—Part I: Optimization Using Design of Experiments, Journal of the European Ceramic Society 24, 2004, 739-752.

Yoon, Dang-Hyok et al., Processing of Barium Titanate Tapes with Different Binders for MLCC Applications—Part II: Comparison of the Properties, Journal of the European Ceramic Society 24, 2004, 753-761.

Buqa, H. et al., Study of Styrene Butadiene Rubber and Sodium Methyl Cellulose as Binder for Negative Electrodes in Lithium-Ion Batteries, Science Direct, Journal of Power Sources, 161 2006, 617-622.

Li, Chia-Chen et al., Effects of pH on the Dispersion and Cell Performance of LiCO02 Cathodes Based on the Aqueous Process, J Mater Sci, 2007, 42:5773-5777.

Lee, Jin-Hyon, et al., Effect of Additives on the Dispersion Properties of Aqueous Based C/LiFePO4 Paste and its Impact on Lithium Ion Battery High Power Properties, Kona Powder and Particle Journal No. 27, 2009, 239-245.

Dalle-Ferrier, Cecile et al., The Role of Chain Length in Nonergodicity Factor and Fragility of Polymers, Macromolecules, 2010, 43, 8977-8984.

Allcock, Harry R. et al., Department of Chemistry, The Pennsylvania State University, Contemporary Polymer Chemistry, Second Edition, 1990, 1981 by Prentice-Hall, Inc., Englewood Cliffs, NJ.

Smart, M.G. et al., Electrochemical Performance and Kinetics of $Li_{1+x}(Co_{1/3}Ni_{1/3}Mn_{1/3})_{1-x}O_2$ Cathodes and Graphite Anodes in Low-Temperature Electrolytes, Journal of Power Sources, 168, 2007, 501-508.

Zhang, Xiaoyu et al., Minimization of the Cation Mixing in $Li_{1+x}(NMC)_{1-x}O_2$ as Cathode Material, Journal of Power Sources, 195, 2010, 1292-1301.

Database WPI, Week 198312, Thomson Scientific, London, GB; AN 1983-29154K; XP-002658868.

PCT/US2011/023265 International Search Report, completed by European Patent Office, mailed on Sep. 23, 2011.

* cited by examiner

RECHARGEABLE BATTERY USING AN AQUEOUS BINDER

FIELD OF INVENTION

The present invention relates to a water soluble binder for use in a rechargeable lithium ion battery and the battery in which the binder is used.

BACKGROUND

Rechargeable batteries use polymer binders to hold together the active particulate material and adhere this particulate material to the current collector in the fabrication of electrodes. The binder is generally comprised of one or more polymers. The binders commonly used in commercial li-ion batteries are polyvinyledene fluoride (PVDF), ethylene-propylene and a diene (EPDM). These polymers are generally insoluble in water and, thus are dissolved in an organic solvent such as N-methylpyrrolidone (NMP). The organic solvent additionally serves as a dispersion medium for the active materials. Some disadvantages of using organic solvents are that they have relatively high cost, can possess negative environmental impacts, and pose disposal issues. Further, PVDF is highly unstable and tends to break down at high temperatures.

Known water soluble binders, such as carboxy methyl cellulose (CMC), require a thickening agent to control the viscosity of the binder. Further, they exhibit only marginal adhesion capability. Polytetrafluoroethylene (PTFE) and styrene butadiene rubber (SBR) based water soluble binders also exhibit poor adhesion and do not exhibit good cycle life. Further, SBR binders exhibit high expandability and undesirable agglomeration characteristics resulting in poor dispersion, poor performance, and high electrode resistance.

Accordingly, there is a need for a water soluble binder in rechargeable lithium batteries. This water soluble binder should exhibit good adhesion in the absence of thickening or wetting agents, low resistance and good chemical and electrochemical stability.

SUMMARY

Briefly, the present invention provides a water-soluble binder comprising a poly (acrylonitrile-co-acrylamide) polymer and water.

The invention further includes a battery comprising a positive electrode mix which contains a positive electrode active material, a water soluble binder comprising a poly (acrylonitrile-co-acrylamide) polymer and water, and a conductive additive. The battery also includes a negative electrode mix comprising a negative electrode active material, a water soluble binder comprising a poly(acrylonitrile-co-acrylamide) polymer and water, and a conductive additive. The battery further includes an electrolyte.

The present invention also includes a battery comprising a positive electrode mix which contains a positive active material selected from the group consisting of $LiCoO_2$, $LiNiO_2$, $LiNi_{1/3}Co_{1/3}Mn_{1/3}O_2$, $LiNi_{0.8}Co_{0.15}Al_{0.05}O_2$, $Li_{1+x}Ni_{1/3}Co_{1/3}Mn_{1/3}O_2$, $LiMn_2O_4$ $LiFePO_4$ coated with graphite and/or carbon and $Li_2Mn_2O_4$. The positive electrode mix also includes a water soluble binder comprising a poly (acrylonitrile-co-acrylamide) polymer and water, as well as a conductive additive or additives selected from the group consisting of carbon black, acetylene black, carbon fibers, coke, high surface area carbon and graphite. The negative electrode mix comprises a negative active material selected from the group consisting of graphite, hard carbon, silicon, tin and lithium titanate. The negative electrode mix also includes, a binder comprising a poly (acrylonitrile-co-acrylamide) polymer and water, as well as the conductive additive or additives. The battery further comprises an electrolyte comprised of a lithium salt in cyclic and linear carbonates.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawing certain embodiments of the present invention. It should be understood, however, that the invention is not limited to the precise arrangements shown. In the drawings.

DETAILED DESCRIPTION OF THE PREFERRED EMBODIMENTS

Figure 1:
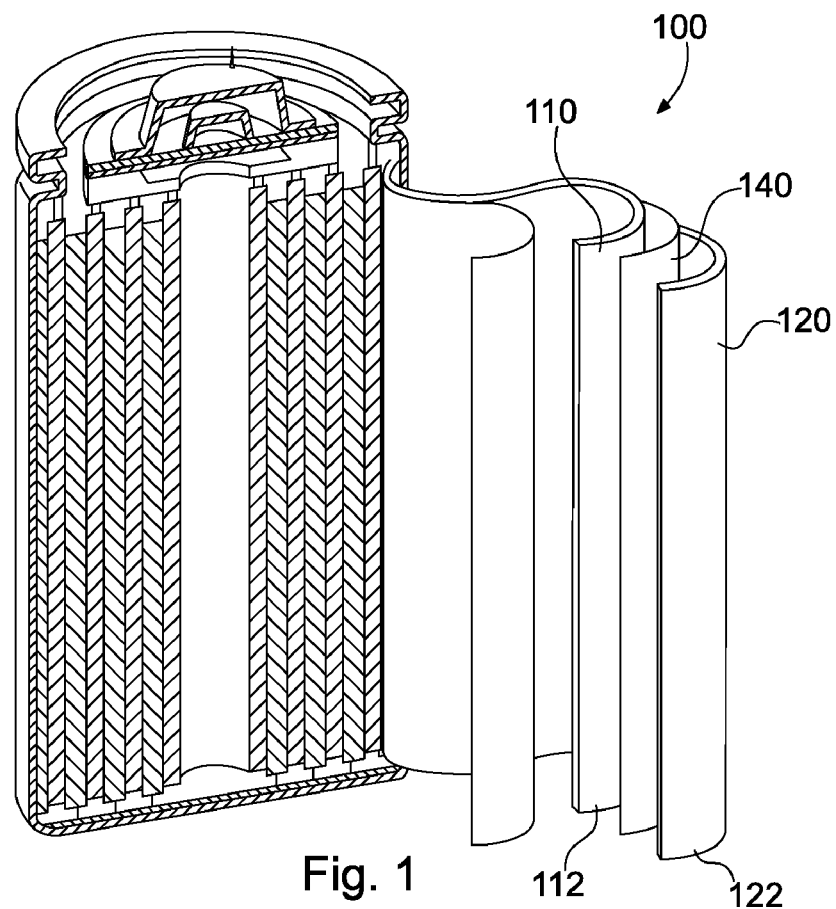
FIG. 1 is a schematic view of a battery formed in a jellyroll configuration according to an exemplary embodiment of the present invention.

In describing the embodiments of the invention illustrated in the drawings, specific terminology will be used for the sake of clarity. However, the invention is not intended to be limited to the specific terms so selected, it being understood that each specific term includes all technical equivalents operating in similar manner to accomplish similar purpose. It is understood that the drawings are not drawn exactly to scale.

The following describes particular embodiments of the present invention. It should be understood, however, that the invention is not limited to the embodiments detailed herein. Generally, the following disclosure refers to lithium ion batteries and a water soluble binder for use in lithium ion batteries.

Figure 1A:
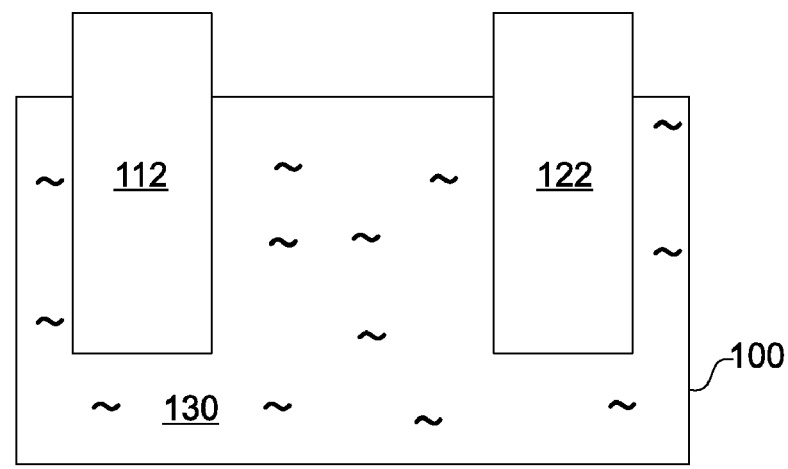
FIG. 1A is a schematic view of the battery of FIG. 1 with the electrolyte.
Figure 2:
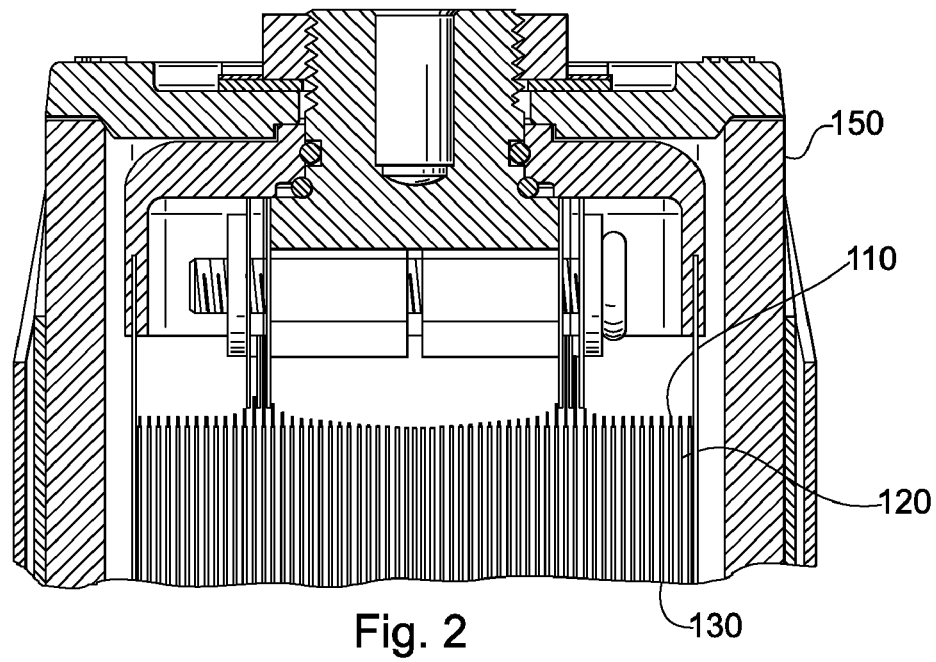
FIG. 2 is a cross-sectional representation of a prismatic electrochemical cell according to an exemplary embodiment of the present invention.

Referring to FIGS. 1 and 1A, a rechargeable battery 100 according to an exemplary embodiment of the present invention includes a positive electrode 112 formed from a positive electrode mix 110, a negative electrode 122 formed from a negative electrode mix 120, and an electrolyte 130. While FIG. 1 illustrates battery 100 formed in a "jellyroll" configuration, those skilled in the art will recognize that other formations, such as, for example, a prismatic configuration, which is illustrated in FIG. 2, may also be used within the teaching of the present invention.

Positive electrode mix 110 exhibits a reduction potential and negative electrode mix 120 has an oxidation potential. Electrolyte 130 transfers ions between positive electrode mix 110 and negative electrode mix 120 within battery 100. Separator 140 separates positive electrode mix 110 from negative electrode mix 120.

Positive electrode mix 110 includes a positive electrode active material selected from the group consisting of $LiCoO_2$, $LiNiO_2$, $LiNi_{1/3}Co_{1/3}Mn_{1/3}O_2$, $LiNi_{0.8}Co_{0.15}Al_{0.05}O_2$, $Li_{1+x}Ni_{1/3}Co_{1/3}Mn_{1/3}O_2$, $LiMn_2O_4$, $LiFePO_4$ coated with at least one of graphite and carbon and $Li_2Mn_2O_4$, and $LiMPO_4$ where M is one or more of the first row transition-metal cations selected from the group consisting of Fe, Mn, Ni, Ti, Co and combinations thereof. In an exemplary embodiment, the positive electrode active material is about 80-95 percent (by weight) of the positive electrode mix 110.

Positive electrode mix 110 further includes a conductive additive or additives selected from the group consisting of carbon black, acetylene black, carbon fibers, coke, high surface area carbon, graphite and combinations thereof. In an exemplary embodiment, the conductive additive material is about 1-10 percent (by weight) of the positive electrode mix 110.

Positive electrode mix 110 also includes a water soluble binder polymer comprising a poly (acrylonitrile-co-acrylamide) polymer and water. The binder is used to bind the positive electrode active material and the conductive additive together to form slurry. The slurry is coated on an aluminum current collector or a carbon coated aluminum current collector to form positive electrode 112. The slurry pH ranges between about 7 and about 9 for a $LiFePO_4$ based system and for other positive electrode mixes, the pH ranges between about 10 and about 12.

An exemplary poly (acrylonitrile-co-acrylamide) polymer and water binder has the chemical formula:

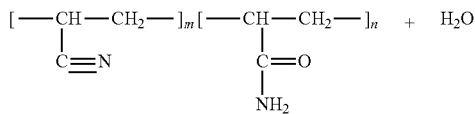

In another exemplary embodiment, the mole ratio of acrylonitrile units to acrylamide units (m:n) is between about 3:1 and 1:1. In another exemplary embodiment, the mole ratio of acrylonitrile units to acrylamide units (m:n) is about 2:1. In an exemplary embodiment, an average molecular weight of the polymer is between about 10,000 and 300,000. In another exemplary embodiment, the average molecular weight of the polymer is between about 100,000 and 200,000. In an exemplary embodiment, the water soluble binder is about 1-10 percent (by weight) of positive electrode mix 110.

The water soluble binder is used to make the slurry in the absence of a thickening agent or any external reagent to control its viscosity. An exemplary binder has a viscosity ranging from 6000-10000 cp. The water soluble binder is also provided in the absence of a wetting agent or any other additives to improve the active material and conductive additive dispersion.

Negative electrode mix 120 comprises a negative electrode active additive or additives material selected from the group consisting of graphite, hard carbon, silicon, tin and lithium titanate. In an exemplary embodiment, the negative electrode active material is about 80-95 percent (by weight) of the negative electrode mix 120.

Negative electrode mix 120 further includes a conductive additive selected from the group consisting of carbon black, acetylene black, carbon fibers, coke, high surface area carbon, graphite and combinations thereof. In an exemplary embodiment, the conductive additive material is about 0-10 percent (by weight) of the negative electrode mix 120.

Negative electrode mix 120 further comprises the water soluble binder as described above with respect to the positive electrode mix 110. In an exemplary embodiment, the water soluble binder is about 1-10 percent (by weight) of the negative electrode mix 120.

Figure 3:
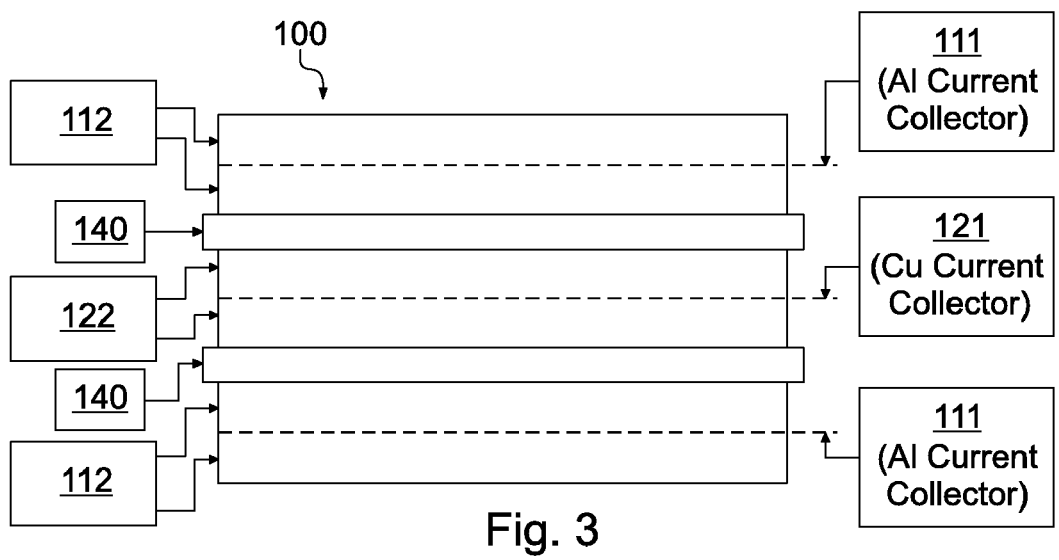
FIG. 3 is a schematic representation of a positive electrode, a separator and a negative electrode-bi-cell configuration of the exemplary embodiment illustrated in FIG. 1.

An exemplary electrolyte 130 may be comprised of lithium salts such as $LiBF_4$, $LiPF_6$, LiBOB, LiTFSI or LiFSI or mixtures thereof in cyclic and linear carbonates To form battery 100, positive electrode mix 110 is coated on an aluminum current collector or a carbon coated aluminum current collector 111, forming a positive electrode 112. The negative electrode mix 120 is coated on a copper current collector 121, forming negative electrode 122. Positive electrode 112 and negative electrode 122 are each then compressed or calendared for specific thickness. Electrodes 112, 122 are stacked as shown in FIG. 3. The stack is dried in a vacuum oven until the moisture is below 2000 ppm, and most preferably below 200 ppm. The electrode stack may be inserted into a polyethylene or polypropylene cell housing 150, shown in FIG. 2, and filled with electrolyte 130, forming battery 100. Battery 100 is then charged and discharged to complete the forming process.

Examples

The following examples are given purely as an illustration and should not be interpreted as constituting any kind of limitation to the invention.

Positive electrode mix 110 was prepared first by dissolving poly (acrylonitrile-co-acrylamide) polymer binder in water. The ratio of binder to water ranges from 15 to 20%. A positive active powder (carbon and/or graphite coated $LiFePO_4$ manufactured by Phostech Lithium, Canada and $LiNi_{1/3}Co_{1/3}Mn_{1/3}O_2$ manufactured by 3M corporation, USA) with an appropriate amount of conductive additive such as for example Super P®, manufactured by Timcal Graphite & Carbon located in Switzerland, was mixed with the binder in water solution for about 2 hrs. The pH of the slurry for $LiFePO_4$ positive mix was between about 7 and about 9 and for $LiNi_{1/3}Co_{1/3}Mn_{1/3}O_2$, the pH range was between about 10 and 12. The homogeneously mixed slurry was then coated on the aluminum current collector or a carbon coated aluminum current collector 111 to form positive electrode 112. Positive electrode 112 was cut into an appropriate size and dried in a vacuum oven until the moisture was below about 1000 ppm and most preferably below about 200 ppm.

Negative electrode mix 120 was prepared first by dissolving poly (acrylonitrile-co-acrylamide) polymer binder in water. The ratio of binder to water ranged from 15% to 20%. A negative active powder (graphite) with an appropriate amount of conductive additive (Super P®) was mixed with the binder in water solution and mixed for about 2 hrs. The pH of the slurry was between about 7 and 9. The homogeneously mixed slurry was then coated on to copper current collector 121 to form negative electrode 122. Negative electrode 122 was cut into an appropriate size and dried in a vacuum oven until the moisture was below about 1000 ppm and most preferably below about 200 ppm.

The cells were built as described in FIGS. 1-3. The cells were then filled with electrolyte 130. The Li-ion cells were in discharged state and had a potential of a few millivolts. FIGS.

Figure 4A:
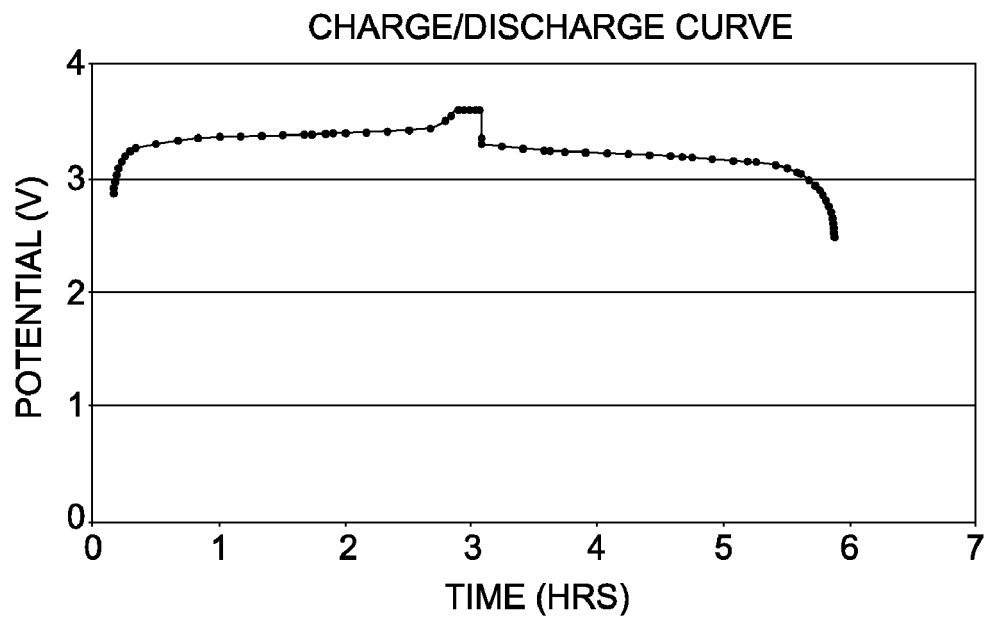
FIG. 4A is a charge/discharge curve for a $LiFePO_4$/Graphite Li-ion cell according to an exemplary embodiment of the present invention.
Figure 4B:
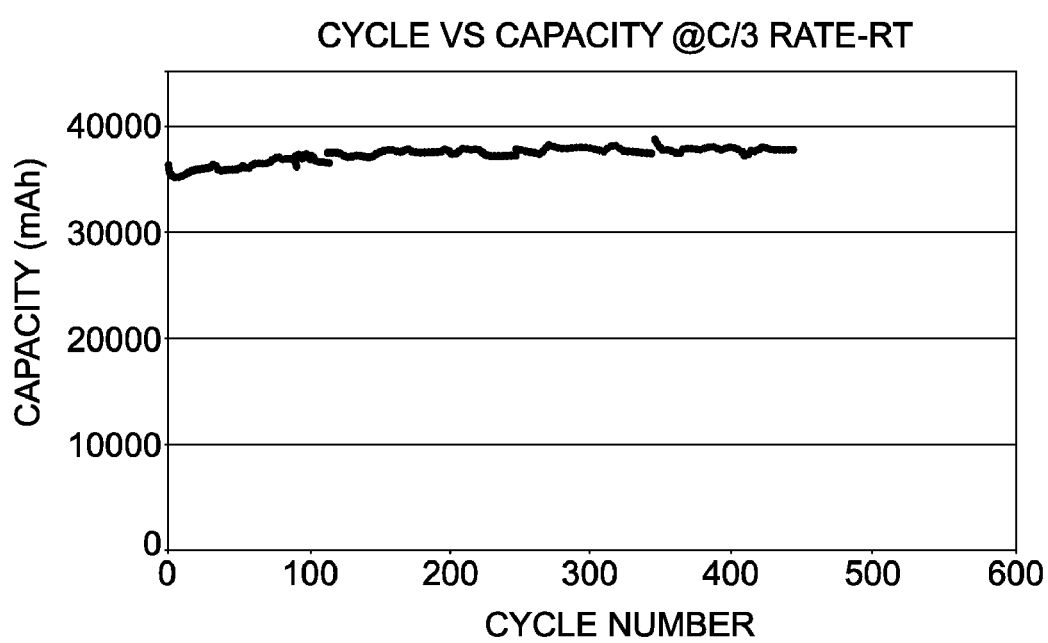
FIG. 4B is a cycle life curve for the $LiFePO_4$/Graphite Li-ion cell whose charge/discharge curve is illustrated in FIG. 4A.
Figure 5A:
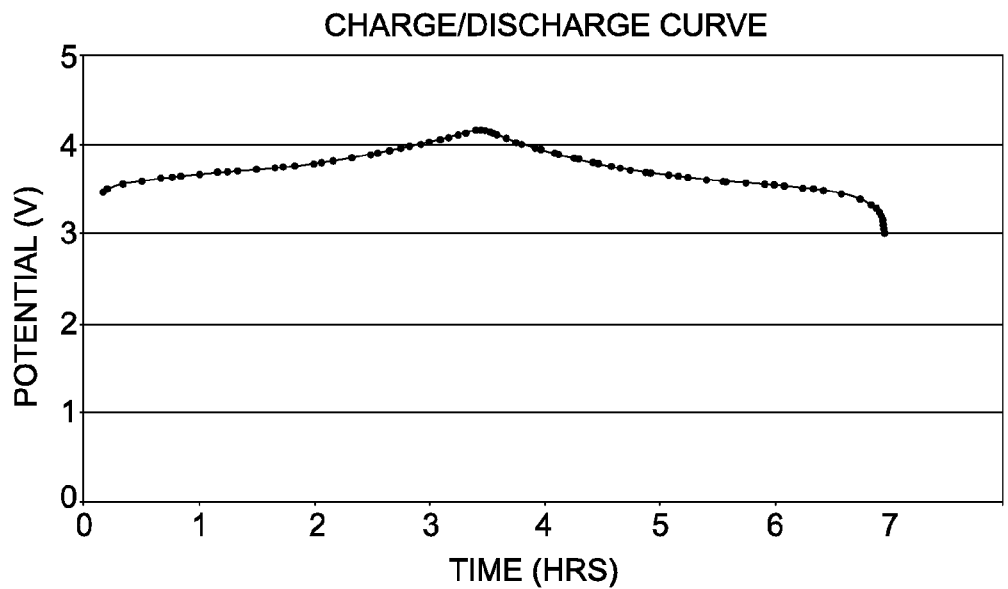
FIG. 5A is a charge/discharge curve for a $LiNi_{1/3}Co_{1/3}Mn_{1/3}O_2$/Graphite Li-ion cell according to another exemplary embodiment of the present invention.
Figure 5B:
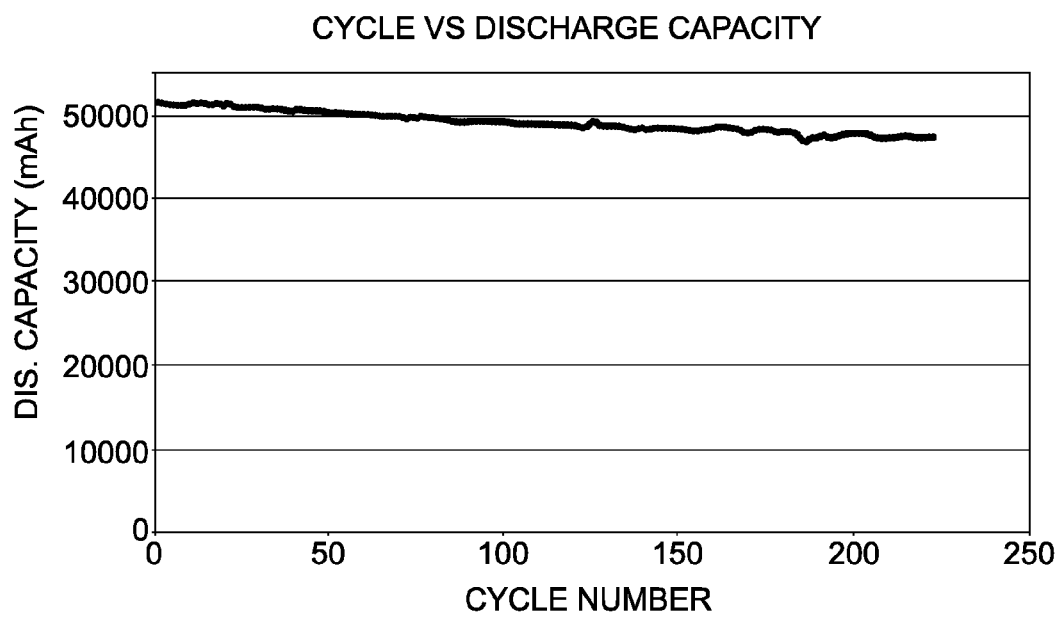
FIG. 5B is a cycle life curve for $LiNi_{1/3}Co_{1/3}Mn_{1/3}O_2$/Graphite Li-ion cell whose charge/discharge curve is illustrated in FIG. 5A.

4A and 5A each illustrate a charge/discharge curve for a LiFePO$_4$ and LiNi$_{1/3}$Co$_{1/3}$Mn$_{1/3}$O$_2$ cathode and a graphite anode, respectively. FIGS. 4B and 5B each illustrate a cycle life curve for the LiFePO$_4$ and LiNi$_{1/3}$Co$_{1/3}$Mn$_{1/3}$O$_2$ cathode and a graphite anode, respectively.

While the principles of the invention have been described above in connection with preferred embodiments, it is to be clearly understood that this description is made only by way of example and not as a limitation of the scope of the invention.

What is claimed is:

1. A battery comprising:
    a positive electrode mix comprising:
        a positive active material comprising a lithium transition metal oxide;
    a water soluble binder comprising a poly (acrylonitrile-co-acrylamide) polymer and water; and
        a conductive additive selected from the group consisting of carbon black, acetylene black, carbon fibers, coke, high surface area carbon and graphite and combination thereof;
    a negative electrode mix comprising:
        a negative active material selected from the group consisting of graphite, hard carbon, silicon, tin and lithium titanate;
        an organic solvent-stable, water soluble binder in the absence of a thickening agent and a wetting agent, the binder comprising a poly (acrylonitrile-co-acrylamide) polymer and water; and
        the conductive additive; and
    an electrolyte comprised of lithium salt in cyclic and linear carbonates.

2. The battery according to claim 1, wherein a mole ratio of acrylonitrile units to acrylamide units is between about 3:1 and 1:1.

3. The battery according to claim 2, wherein the mole ratio of acrylonitrile units to acrylamide units is about 2:1.

4. The battery according to claim 1, wherein an average molecular weight of the polymer is between about 10,000 and 200,000.

5. The battery according to claim 4, wherein the average molecular weight of the polymer is between about 100,000 and 200,000.

6. The battery according to claim 1, wherein the lithium transition metal oxide is selected from the group consisting of LiCoO$_2$, LiNiO$_2$, LiNi$_{1/3}$Co$_{1/3}$Mn$_{1/3}$O$_2$, LiNi$_{0.8}$Co$_{0.15}$Al$_{0.05}$O$_2$, Li$_{1+x}$Ni$_{1/3}$Co$_{1/3}$Mn$_{1/3}$O$_2$, LiMn$_2$O$_4$ LiFePO$_4$ coated with one of graphite and carbon and Li$_2$Mn$_2$O$_4$, LiMPO4 where M is one or more of the first row transition-metal cations selected from the group consisting of Fe, Mn, Ni, Ti, Co and combinations thereof.

7. A battery comprising:
    a positive electrode mix comprising:
        a positive electrode active material;
        a water soluble binder comprising a poly (acrylonitrile-co-acrylamide) polymer and water; and
        a conductive additive;
    a negative electrode mix comprising:
        a negative electrode active material;
        a water soluble binder comprising a poly (acrylonitrile-co-acrylamide) polymer and water; and
        a conductive additive; and
    an electrolyte, and wherein the water soluble binder is provided in the absence of a thickening agent and a wetting agent.

8. The battery according to claim 7, wherein the positive electrode active material comprises between about 80 to 95 percent by weight of the positive electrode mix.

9. The battery according to claim 8, wherein the conductive additive material comprises between about 1 to 10 percent by weight of the positive electrode mix.

10. The battery according to claim 9, wherein the water soluble binder comprises between about 1 to 10 percent by weight of the positive electrode mix.

11. The battery according to claim 7, wherein the negative electrode active material comprises between about 80 to 95 percent by weight of the negative electrode mix.

12. The battery according to claim 11, wherein the conductive additive material comprises between about 0 to 10 percent by weight of the negative electrode mix.

13. The battery according to claim 12, wherein the water soluble binder comprises between about 1 to 10 percent by weight of the negative electrode mix.

* * * * *

UNITED STATES PATENT AND TRADEMARK OFFICE
CERTIFICATE OF CORRECTION

| | | |
|---|---|---|
| PATENT NO. | : 8,076,026 B2 | Page 1 of 1 |
| APPLICATION NO. | : 12/701001 | |
| DATED | : December 13, 2011 | |
| INVENTOR(S) | : Milburn Ebenezer Jacob Muthu et al. | |

It is certified that error appears in the above-identified patent and that said Letters Patent is hereby corrected as shown below:

Title Page item 54, and col. 1

Cancel the title "RECHARGABLE BATTERY USING AN AQUEOUS BINDER" and insert the following:

--AQUEOUS CO-POLYMER BINDER FOR LI-ION BATTERY--.

Signed and Sealed this
Twentieth Day of March, 2012

David J. Kappos
*Director of the United States Patent and Trademark Office*